United States Patent [19]

Castiglioni

[11] Patent Number: 4,836,073
[45] Date of Patent: Jun. 6, 1989

[54] MACHINE FOR SLITTING CONTINUOUS TAPES INTO STRIPES, IN PARTICULAR WITH CUTTING CYLINDERS HAVING VARIABLE SIZE

[75] Inventor: Giovanni P. Castiglioni, Castellanza, Italy

[73] Assignee: F.I.C.I. Finanziaria Industriale Commerciale Immobiliare SpA, Milan, Italy

[21] Appl. No.: 249,244

[22] Filed: Sep. 1, 1988

Related U.S. Application Data

[63] Continuation of Ser. No. 933,977, Nov. 24, 1986, abandoned.

[30] Foreign Application Priority Data

Dec. 11, 1985 [IT] Italy ................. 23170 A/85

[51] Int. Cl.$^4$ .................. B23D 19/06; B26D 1/24
[52] U.S. Cl. ........................ 83/344; 83/481; 83/507; 83/698
[58] Field of Search ............ 83/344, 345, 425.3, 83/425.4, 481, 498–504, 508.3, 700, 331, 343, 698, 700, 699; 72/248, 237, 238, 249

[56] References Cited

U.S. PATENT DOCUMENTS

| 1,796,447 | 3/1931 | Foren | 72/248 |
| 2,145,048 | 1/1939 | Hagen | 83/343 |
| 2,251,313 | 8/1941 | Yoder | 83/481 |
| 3,272,042 | 9/1966 | Haas | 83/498 |
| 3,863,537 | 2/1975 | Huelsman | 83/699 |
| 4,450,740 | 5/1984 | Chapman, Jr. et al. | 83/344 |
| 4,470,331 | 9/1984 | Eiting et al. | 83/344 |

FOREIGN PATENT DOCUMENTS 838388  5/1952  Fed. Rep. of Germany ........ 83/343

Primary Examiner—Frank T. Yost
Assistant Examiner—Hien H. Phan
Attorney, Agent, or Firm—Diller, Ramik & Wight

[57] ABSTRACT

The present invention relates to a machine for slitting continuous tapes into sets of stripes having variously shaped lateral profile, with the possibility of applying cutting cylinders having size as desired, and possibility of modification of the mutual position of the cylinder supporting shoulders, so that tapes can be machined, which have different width, and of the cutting cylinders supporting elements, so to vary the distance between the centers of the said cylinders.

20 Claims, 3 Drawing Sheets

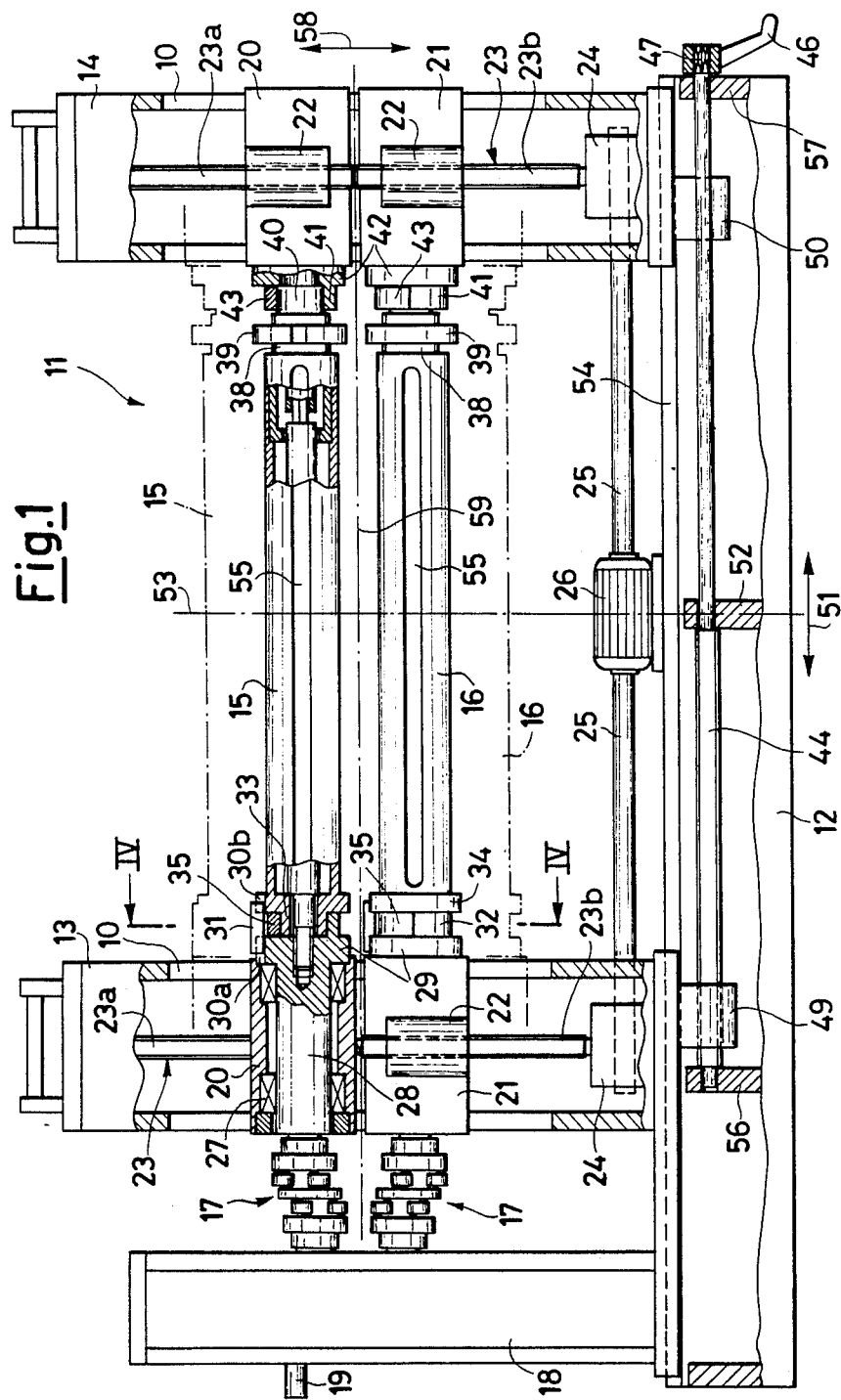

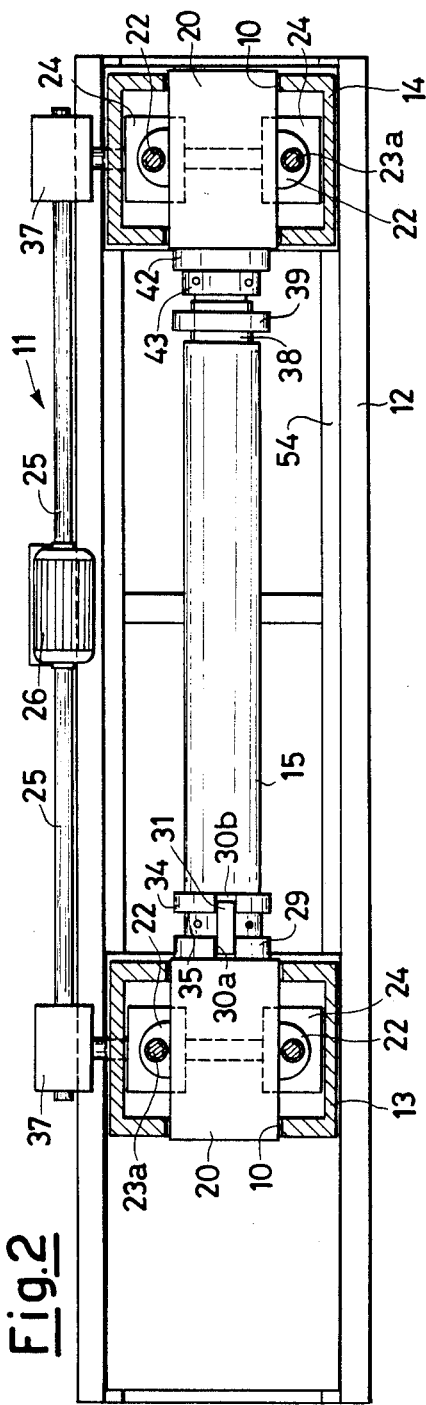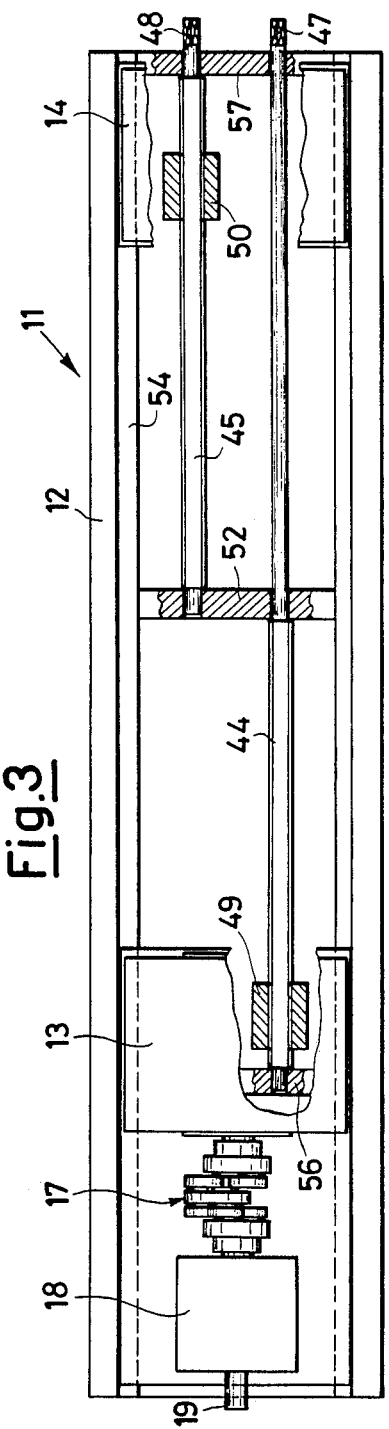

MACHINE FOR SLITTING CONTINUOUS TAPES INTO STRIPES, IN PARTICULAR WITH CUTTING CYLINDERS HAVING VARIABLE SIZE

This is application is a continuation of application Ser. No. 06/933,977, filed 11/24/86 now abandoned.

The present invention relates to a machine for slitting continuous tapes into stripes, in particular with cutting cylinders of variable size.

Machines are known for slitting continuous tapes into longitudinal stripes having shaped lateral profile, of the type comprising a base on which there is essentially installed a stand for supporting, between two shoulders, a couple of cylinders or mandrels provided with a set of cutting blades.

The adjustment, or also the change of the cutting cylinders results rather toilsome, because it must be provided for the stand shoulders to be shifted, the cylinders to be removed, the possible extensions to be disconnected, and in any case, precise dimensions exist, which must be compiled with, as regards both the stop ledges on the bases, and the connections of the cutting cylinders, as well as the position of the units transmitting the movement to the cutting cylinders.

In other tape cutting machines of the prior art, a set of pre-assembled stands is provided, which are inserted in the slitting line, as a function of the size of the tape to be slit.

Purpose of the present invention is to provide a machine for slitting continuous tapes into stripes, which allows operating on tape reels of any size, and which allows its useful operational size to be changed by means of a simple intervention of extraction and replacement of the cutting cylinders, without the whole set of disassemblages and assemblages of the various components of the machines of the prior art having to be done.

A further purpose is to provide a quick replacement of the operational cutting cylinders, without a considerable amount of assembled stands having necessarily to be available, with the need of related structures which involve investments, considerable volumes for their storage, and a certain limitedness in possibilities of material machining.

These and other purposes according to the present invention are achieved by providing a machine for slitting tapes into stripes, in particular with cutting cylinders of variable size, comprising, on a base, a pair of shoulders for supporting said cutting cylinders, a reduction unit which transmits the revolution motion to said cylinders associated to one of the said shoulders, and a set of cutting elements to be freely positioned on said cutting cylinders, characterized in that said shoulders can be shifted relatively to each other, by being approached to, or spaced apart from, each other, on guides arranged on the said base, by translation means perpendicular to the direction of progress of the continuous tape, and that said cutting cylinders are supported, at their ends, inside bases positioned inside said shoulders, and controlled to vertically slide, so to approach to, and to get spaced apart from, each other, by centralized motion driving means.

The structural and functional characteristics and the advantages of a tape slitting machine according to the present invention shall be better understood from the following exemplifying and not limitative disclosure, referred to the related schematic drawings, wherein:

FIG. 1 is a partly sectional elevation view of a machine according to the invention;

FIG. 2 is a partly sectional plan view;

FIG. 3 is a partly sectional, according to a different plane, plan view;

Figure 4:
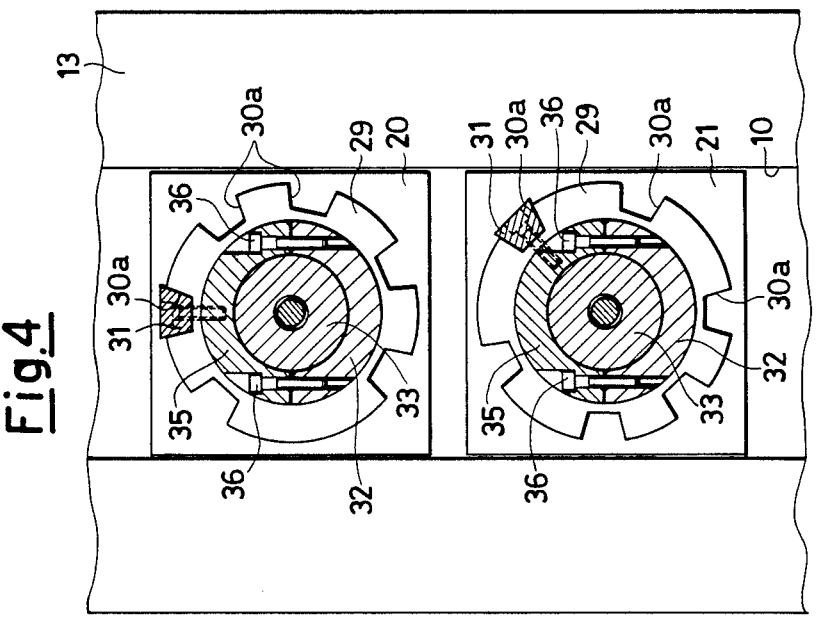
FIG. 4 is a sectional view according to path IV—IV of FIG. 1.
Figure 6:
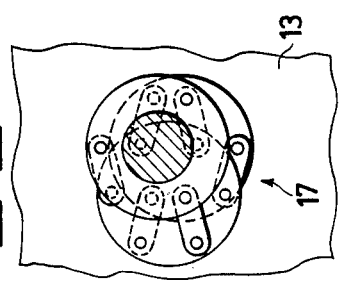
FIG. 6 is a view according to path IV—IV of FIG. 5.
Figure 8:
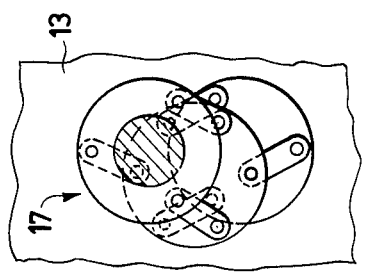
FIG. 8 is a view according to path VIII—VIII of FIG. 7.
Figure 5:
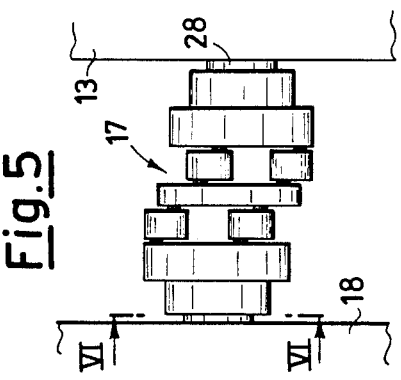
FIG. 5 is a side view of a magnified detail of the lower joint of FIG. 1.
Figure 7:
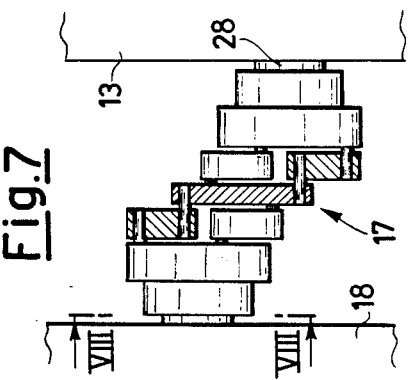
FIG. 7 is a partly sectional view of the joint of FIG. 5, in a different operational stage.

Referring to the drawings, a machine for slitting continuous tapes into stripes according to the invention is generally indicated with 11, and is essentially comprising, on a base 12, a stand constituted by a couple of shoulders 13 and 14 supporting a couple of cylinders constituted by an upper, 15, and a lower, 16, revolving cutting cylinders or mandrels.

The ends of the cutting cylidners 15 and 16 supported inside the shoulder 13 result connected by means of joints 17, e.g., of the epicycloidal type, to a reduction unit 18, denominated as the "spindle housing", which receives the motion through a shaft 19 from a drive unit (not shown).

Each shoulder 13 and 14 is provided inside its interior with a couple of bases or slides consisting of an upper base or slide 20 and a lower base or slide 21, vertically sliding, to be approached to, or to be spaced apart from, each other, inside related seats 10, laterally provided inside the same shoulders 13 and 14, and rotatably supporting the said cutting cylinders 15 and 16 at their ends.

End base 20, 21 bears, constrained in its interior, and positioned at vertically opposite sides, in a through-passing arrangement, a pair of nut screws 22 coupled to related vertical screws 23 fastened inside the shoulders 13, 14, each of said screws 23 having two portions, the one with left-hand screw thread 23a, and the other with right-hand screw thread 23b, and being suitable to be driven to rotate both clockwise and counterclockwise by a related reduction unit 24 installed immediately above the base 12 in the bottom portion of the shoulders 13, 14. Such a device allows the vertical distance between the centres of the cutting cylinders 15 and 16 to be varied according to as required, and relatively to their size.

The reduction units 24 are driven to move by means of kinematic transmissions 37 by a grooved bar 25 positioned behind said shoulders 13, 14, and operatively driven by a central ratiomotor 26 performing the function of centralized means for the bases motion drive.

Inside each of the bases 20, 21, between the two opposite nut screws 22, the end of the cutting cylinders 15 and 16 is supported.

More precisely, inside the shoulder 13, inside the vertically sliding slides 20, 21, supported is, on bearings 27, a hub 28, directly keyed to, and integral with the joints 17.

On the hub 28 provided is an end flange 29, provided, in its turn, with a set of radial seats or notches 30a, inside which a key 31 is inserted, e.g., to latch the cutting cylinder 15, once that the latter has been positioned in the proper timing phase with the cutting elements (not shown) of the other cylinder 16.

The flange 29 extends, in the axial direction of hub 28, into a cradle 32, or a "C"-shaped ring portion, which houses and supports a cylindrical end 33 of the cutting cylinder 15 and 16, said cylinder 15 and 16 being provided, too, with a flange 34, similar to flange 29 of hub 28, so to accomplish the driving coupling, and to be used as stop ledge for the cutting elements (not shown).

Also the flange 34 has a set of radial seats or notches 30b, which house the other end of the key 31, so to latch the cutting cylinder 15 or 16 to the hub 28.

A further ring or collar portion 35 is positioned above the cradle 32, to lock the cylindrical end 33 of the cutting cylinder 15 and 16, the portions 32 and 35 beig constrained to each other by, e.g., a pair of screws 36.

Another opposite end of the cutting cylinders 15, 16 supports and houses, on a threaded portion 38, a nut screw 39 for the axial lock on the cylinders 15, 16 of the cutting elements (not shown), constrained to rotate by means of a longitudinal feather 55, and ends with a coaxial, reduced-diameter, cylindrical end portion 40, suitable to be positioned on a cradle 41, quite similar to the ring portion 32, provided at the end of an idle hub 42 protruding from the body of the shoulder 14, and axially lined up to the hub 28 of the shoulder 13.

Also in the case, a further ring portion 43 can be coupled to the cradle 41 by means of screws (not shown), so to latch the cylindrical portion 40 to the idle hub 42.

Inside the base 12 means are provided for the translation of the shoulder, which are constituted by a couple of drive screws 44 and 45, actuatable sideways to the base 12 by means of a winch 46 to be selectively applied on their ends 47 and 48, which engage inside nut screws 49 and 50 integral with the basis of the same shoulders 13 and 14.

The shoulders 13 and 14 are thus shifted by the said translation means, independently from each other, in the direction, as indicated by arrow 51, perpendicular to the rn of the plane laminate or tape to be slit passing between the cylinders 15 and 16, and allow cutting cylinders to be mounted with different table, depending on the contingent need.

A central crossbeam 52 is futhermore provided inside the base 12, in correspondence of which a cutting symmetry axis 53 is fixed, and relatively to which the two shoulders 13 and 14 are moved, by, e.g., sliding along guides 54 above the base 12.

The central crossbeam 52, together with two side crossbeams 56 and 57, fastened onto the base 12, support rotatably the drive screws 44 and 46, at their ends, so to allow them to be actuated in order to shift the shoulders.

In a machine according to the instant invention, once that the width of the metal tape to be slit has been determined, corresponding cutting cylinders are selected and prepared.

More precisely, a whole set of blades and counter-blades (not shown) are arranged on the mandrels 15 and 16, they being engaged by means of a longitudinal feather 55, and being locked in their operative position by coming to rest, on one side, against the flange 34, and, on the other side, by screwing down the nut screw 39 on the threaded screw portion 38, and latching it.

The cutting mandrels or cylinders 15 and 16 so prepared are ready to be mounted between the shoulders 13 and 14 on the cradles 32 and 41, so to be supported during the operative stage.

In the mean time, the shoulders 13 and 14 have been so positioned as to be able to house, in the right measure, and nearly in close adjustment, the cutting cylinders 15 and 16.

During such a positioning, by the individual cutting cylinder 15 and 16 being rotated on the cradles 32 and 41, it is so positioned that the grooves 30b provided on the flange 34 are placed in correspondence of the grooves 30a of the flange 29, so to accomplish the desired timing, relatively to the cutting elements used. This results particularly important for the timing of the cutting elements having not rectilinear, variously shaped profile; by so doing, in fact, ensuring the perfect matchability between the profiles of the upper and lower cutting elements, and, in any case, avoiding their cutting edges from getting superimposed to each other, is possible.

Subsequently, the collar 35, and finally the key 31, which makes the revolution motion of hub 28 solid with the motion of the cutting cylinder 15 and 16, is mounted.

It is evident that also the collars 43 have been positioned above the cradles 41, so to constrain also the cylindrical portions 40 to the idle hub 42.

This quick and easy positioning of the cutting cylinders 15 and 16 is allowed precisely because according to the invention the machine for slitting the continuous tapes into stripes is provided with an immediate double adjustment, viz., with the possibility of varying the vertical distance between the centres of the cutting cylinders, as a function of their diameter, and of the diameter of the cutting elements, and with the possibility of relative shift of the stand heads, the one independently from the other, relatively to a slitting symmetry axis.

In fact, by actuating the ratiometer 26, which promotes the rotation of the grooved bar 25 and the consequent motion of the transmission 37, the motion is transmitted to the four reduction units 24, positioned two-by-two at the basis of the shoulders 13 or 14.

From such a motion, the rotation derives of the screws 23 with the left-hand, 23a, and the right-hand, 23b, threaded screw portions, inside the related nut screws 22, so to oblige the bases 20 to vertically move relatively to the basis 21, e.g., to move away from each other, in the direction of the arrow 58 of FIG. 1, up to reach a position of greater opening, relatively to a central horizontal axis 59 of passage and machining of the tape to be slit, schematically shown in chain.

In this case, the continuity of reception of the transmission of the revolution motion to the cutting cylinders 15 and 16 is secured by the presence of the epicycloidal joints 17, which fit, automatically, and precisely because of their same nature, to the different distance between the centres of the cylinders, as schematically shown in the FIGS. from 5 to 8.

The importance of such a movement consists in the possibility of providing with the proper fixtures, on the ground, cutting cylinders or mandrels with cutting elements having variable outer diameter. The variation in diameter is caused, besides by the difference of the tape material to be slit, also by the development of the more or less curved or sinusoidal profile of the blades with non-rectilinear profile.

The shift of the heads 13 and 14, once that the selection has been carried out of the cutting cylinders 15 and 16 and that the relative position of the bases 20 and 21, which support them, has been fixed, is made by acting, by the winch 46, or also by suitable drive means (not shown), solid with the base 12, on the drive screws 44 and 45.

This causes the nut screws 49 and/or 50 to slide relatively to the screws 44 and/or 45, and the shoulders 13 and/or 14, integral with the same nut screws, to consequently translate.

As it results from the particular realization and positioning of the crossbeams 52, 56 and 57, also the shifting of one single shoulder, either 13 and 14, can be accomplished, if cylinders have to be mounted in a not perfectly symmetrical position relatively to the cutting symmetry axis 53.

Also this adjustment of the shoulders is performed without any dismantling of the stand, or, better, of the machine, but with the only removal of the cylinders.

Such a mechanism results furthermore very advantageous also for an at least partial recovery action of possible backlashes, or faulty positioning, and allows the cutting cylinders to be mounted more easily and quickly.

Furthermore, devices can be provided for recovering possible backlashes both inside the cutting cylinders or mandrels, and in the connection joints between the shoulder and the main reduction unit which transmits the rotation, as well as, finally, in the nut screw 22 - screw 23 coupling, driving the bases 20, 21.

I claim:

1. A machine for slitting a tape into strips comprising a pair of mandrels adapted to carry cutting elements thereon, each of said pair of mandrels having axially opposite end portions, means at and axially outboard of said axially opposite mandrel end portions and in generally axially alignment therewith for journaling said mandrels for rotation about generally parallel axes, a pair of stands contiguous said mandrel axial opposite end portions, said journaling means being carried by said stands, means for adjustably slidably connecting each of said mandrel end portions to an associated stand whereby said mandrels can be spaced different radial distances from each other to accommodate different sizes of cutting elements, means for relatively moving said stands toward and away from each other to effect removal and assembly of said mandrel relative to said stands, coupling means disposed generally axially between at least one end portion of each mandrel and its adjacent journaling means, each of said coupling means including a projection and a cradle, one of said projection and cradle being carried by one of said mandrel at least one end portion and said adjacent journaling means, the other of said projection and cradle being carried by the other of said mandrel at least one end portion and said adjacent journaling means, and means disposed generally axially between at least one end portion of each mandrel and its adjacent journaling means for releasably locking said projection in said cradle.

2. The slitting machine as defined in claim 1 including means for accurately locating each said projection and cradle in relative rotational relationship to each other prior to locking the same together by said releasable locking means.

3. The slitting machine as defined in claim 1 wherein each projection is carried by the associated mandrel one end portion and each cradle is carried by the associated journaling means.

4. The slitting machine as defined in claim 1 wherein each said cradle and associated locking means define a generally annular recess.

5. The slitting machine as defined in claim 1 wherein said adjustable slidable connecting means include a slide connecting each journaling means to an associated stand.

6. The slitting machine as defined in claim 1 wherein said adjustable slidable connecting means includes a slide associated with each mandrel end portion mounted for sliding movement relative to an associated stand, generally upstanding means associated with said slides for effecting movement thereof selectively toward and away from each other, and common drive means for simultaneously moving said slides relative to said upstanding means.

7. The slitting machine as defined in claim 1 wherein said adjustable slidable connecting means includes a slide associated with each mandrel end portion mounted for sliding movement relative to an associated stand, generally upstanding means associated with said slides for effecting movement thereof selectively toward and away from each other, common drive means for simultaneously moving said slides relative to said upstanding means, said upstanding means are threaded screws threadedly connected to said slides, and said common drives means impart rotation to said threaded screws.

8. The slitting machine as defined in claim 1 wherein said adjustable slidable connecting means includes a slide associated with each mandrel end portion mounted for sliding movement relative to an associated stand, generally upstanding means associated with said slides for effecting movement thereof selectively toward and away from each other, common drive means for simultaneously moving said slides relative to said upstanding means, said upstanding means are threaded screws threadedly connected to said slides, each threaded screw has opposite reversely threaded end portions, and said common drive means impart rotation to said threaded screws.

9. The slitting machine as defined in claim 1 including means for accurately locating each said projection and cradle in relative rotational relationship to each other prior to locking the same together by said releasable locking means, and said locating means are defined by interengaged slots and keys.

10. The slitting machine as defined in claim 1 including means for accurately locating each said projection and cradle in relative rotational relationship to each other prior to locking the same together by said releasable locking means, and said locating means are defined by at least one key interengaged in one slot of each adjacent ones of said adjacent journaling means and mandrel at least one end portion.

11. The slitting machine as defined in claim 1 wherein said adjustable slidable connecting means includes a slide associated with each mandrel end portion mounted for sliding movement relative to an associated stand, said journaling means are rotatably journaled in said slides, and each projection is carried by an associated mandrel one end portion and each cradle is carried by the associated journaling means.

12. The slitting machine as defined in claim 11 wherein each said cradle and associated locking means define a generally annular recess.

13. The slitting machine as defined in claim 11 including means for accurately locating each said projection and cradle in relative rotational relationship to each other prior to locking the same together by said releasable locking means, and said locating means are defined by at least one key interengaged in one slot of each of adjacent ones of said adjacent journaling means and mandrel at least one end portion.

14. The slitting machine as defined in claim 1 wherein said journaling means is defined by a hub shaft journaled by bearings in an associated stand, each hub shaft is in generally axial alignment with an associated mandrel end portion, and said coupling means are in part carried by an associated hub shaft.

15. The slitting machine as defined in claim 14 including interengaged slot and key means for connecting each hub shaft and its associated mandrel end portion in predetermined relative rotational relationship to each other.

16. The slitting machine as defined in claim 15 wherein said slot and key means include a slot in adjacent associated hub shaft and mandrel end portion and a key received in and in spanning relationship between said slots.

17. The slitting machine as defined in claim 16 wherein said locking means includes a collar opposing each cradle and housing an associated mandrel projection therein, and said locking means further includes means for fastening each associated collar and cradle to each other.

18. The slitting machine as defined in claim 14 wherein said locking means includes a collar opposing each cradle and housing an associated mandrel projection therein, and said locking means further includes means for fastening each associated collar and cradle to each other.

19. The slitting machine as defined in claim 15 wherein said locking means includes a collar opposing each cradle and housing an associated mandrel projection therein, and said locking means further includes means for fastening each associated collar and cradle to each other.

20. The slitting machine as defined in claim 1 wherein said locking means includes a collar opposing each cradle and housing an associated mandrel projection therein, and said locking means further includes means for fastening each associated collar and cradle to each other.

* * * * *